G. H. Dow.
Churn Dasher.

Nº 68,354.   Patented Sept. 3, 1867.

Witnesses.
W. H. Burridge
Frank S. Alden.

Inventor.
George H. Dow.

United States Patent Office.

GEORGE H. DOW, OF FREEPORT, ILLINOIS.

Letters Patent No. 68,354, dated September 3, 1867.

IMPROVEMENT IN CHURN-DASHER.

*The Schedule referred to in these Letters Patent and making part of the same.*

TO ALL WHOM IT MAY CONCERN:

Be it known that I, G. H. Dow, of Freeport, in the county of Stephenson, and State of Illinois, have invented certain new and useful Improvements in Churn-Dashers; and I do hereby declare that the following is a full and complete description of the same, reference being had to the accompanying drawings, making a part of this specification, in which—

Figure 1:
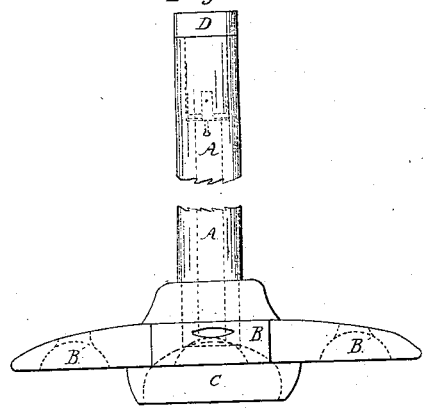
Figure 2:
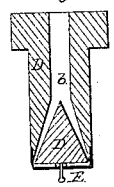
Figure 3:
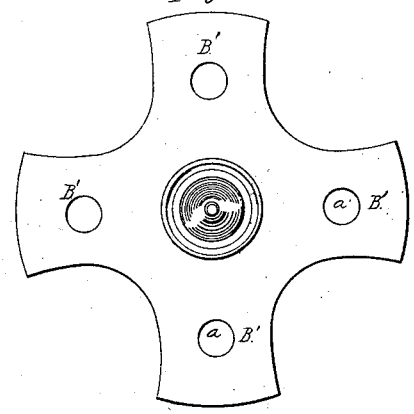
Figure 4:
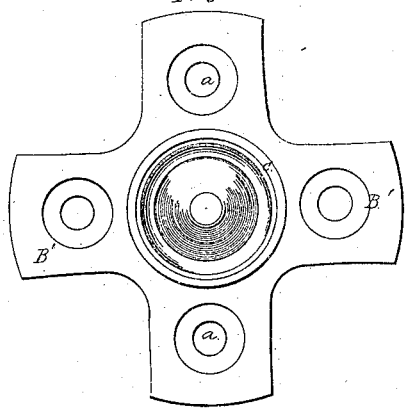

Figure 1 is a side view.
Figure 2 is a detached section.
Figure 3 is a top view.
Figure 4 is a view of the under side.

Like letters of reference refer to like parts in the views.

In the drawings, A represents a tubular shaft, and B the dasher, provided with arms B'. This shaft can be made either long or short, according to the size of the churn, and can be operated by hand or any mechanical means. Near each end of the arms is a hole, $a$, shown in figs. 2 and 3, the arms being curved from the shaft to the ends, as shown in fig. 1. C is a projection from the under side of the dasher, and which is concaved, as shown in fig. 4, and the dotted line, fig. 1. The holes $a$ are also concaved, shown in figs. 1 and 4. In the top of the shaft is placed the detachable valve-seat D, a vertical section of which is shown in fig. 2, in which D' is the valve that rests upon the support E, as represented.

When the dasher is pushed down in churning, the air will force the valve D' up, and thus close the opening $b$, and prevent the cream from being thrown out, and as the dasher is raised the valve will open, allowing a current of air to pass in, and by means of the concaving openings and the projections C in the under side of the dasher, the cream is greatly and successfully agitated.

What I claim as my improvement, and desire to secure by Letters Patent, is—

The valve-seat D and valve D', in combination with the dasher B and shaft A, when constructed as and for the purpose set forth.

GEORGE H. DOW.

Witnesses:
C. H. NICHOLS,
JAS. M. WHITMORE.